US009411182B2

(12) United States Patent
Wakabayashi et al.

(10) Patent No.: US 9,411,182 B2
(45) Date of Patent: *Aug. 9, 2016

(54) SIGNAL PROCESSING DEVICE, SIGNAL PROCESSING METHOD, LIQUID CRYSTAL DEVICE, AND ELECTRONIC APPARATUS

(71) Applicant: SEIKO EPSON CORPORATION, Tokyo (JP)

(72) Inventors: Junichi Wakabayashi, Matsumoto (JP); Haruhiko Nishimura, Shiojiri (JP); Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 367 days.

This patent is subject to a terminal disclaimer.

(21) Appl. No.: 13/917,428

(22) Filed: Jun. 13, 2013

(65) Prior Publication Data

US 2013/0335650 A1    Dec. 19, 2013

(30) Foreign Application Priority Data

Jun. 18, 2012 (JP) ................................ 2012-136615

(51) Int. Cl.
G02F 1/133 (2006.01)
G09G 3/36 (2006.01)

(52) U.S. Cl.
CPC .......... G02F 1/13306 (2013.01); G09G 3/3648 (2013.01); G09G 2320/0209 (2013.01); G09G 2320/0285 (2013.01)

(58) Field of Classification Search
CPC ............. G09G 3/36; G09G 5/00; G09G 5/02; G09G 5/10; G09G 3/3648; G09G 2320/0209; G09G 2320/0285; G06K 9/40; G02F 1/13306
See application file for complete search history.

(56) References Cited

U.S. PATENT DOCUMENTS

| 9,001,168 | B2 * | 4/2015 | Nishimura et al. | 345/694 |
| 2003/0156121 | A1 | 8/2003 | Willis | |
| 2005/0104833 | A1 | 5/2005 | Ochi et al. | |
| 2007/0273715 | A1 | 11/2007 | Sugiyama | |
| 2008/0018630 | A1 | 1/2008 | Fujino | |
| 2008/0310752 | A1 * | 12/2008 | Han et al. | 382/274 |
| 2009/0021537 | A1 * | 1/2009 | Noguchi et al. | 345/690 |

(Continued)

FOREIGN PATENT DOCUMENTS

| JP | 2009-025417 A | 2/2009 |
| JP | 2009-104053 A | 5/2009 |

(Continued)

Primary Examiner — Lun-Yi Lao
Assistant Examiner — Johny Lau
(74) Attorney, Agent, or Firm — Maschoff Brennan

(57) ABSTRACT

A signal processing device, on the basis of signals that control voltages to be applied to pixels, a boundary between a first pixel corresponding to a first signal that applies a first voltage and a second pixel adjacent to the first pixel and corresponding to a second signal that applies a second voltage different from the first voltage at least by a predetermined threshold. The first signal is corrected to a third signal that applies a third voltage higher than the first voltage, and the second signal is corrected to a fourth signal that applies a fourth voltage higher than the second voltage. The second voltage is higher than the first voltage, the fourth voltage is higher than the third voltage, and a potential difference between the first voltage and the third voltage is larger than a potential difference between the second voltage and the fourth voltage.

12 Claims, 11 Drawing Sheets

(56) References Cited

U.S. PATENT DOCUMENTS

| | | |
|---|---|---|
| 2009/0073192 A1 | 3/2009 | Kobayashi |
| 2009/0109210 A1 | 4/2009 | Ito |
| 2009/0153743 A1 | 6/2009 | Arashima |
| 2009/0243983 A1 | 10/2009 | Ohashi et al. |
| 2010/0007592 A1 | 1/2010 | Priem et al. |
| 2010/0098349 A1 | 4/2010 | Arashima et al. |
| 2010/0156772 A1 | 6/2010 | Arashima et al. |
| 2011/0051006 A1 | 3/2011 | Iisaka et al. |
| 2011/0057961 A1 | 3/2011 | Tsuru et al. |
| 2011/0205439 A1 | 8/2011 | Iisaka et al. |
| 2011/0205440 A1 | 8/2011 | Hosaka et al. |
| 2011/0205479 A1 | 8/2011 | Hosaka et al. |
| 2011/0248979 A1* | 10/2011 | Nishimura .................... 345/211 |
| 2012/0242717 A1 | 9/2012 | Kurosawa |
| 2012/0320104 A1* | 12/2012 | Tokumura .................... 345/690 |
| 2013/0241967 A1 | 9/2013 | Nishimura et al. |
| 2013/0241968 A1 | 9/2013 | Wakabayashi et al. |

FOREIGN PATENT DOCUMENTS

| | | |
|---|---|---|
| JP | 2009-104055 A | 5/2009 |
| JP | 2009-169411 A | 7/2009 |
| JP | 2009-237366 A | 10/2009 |
| JP | 2009-237524 A | 12/2012 |
| JP | 2012-252042 A | 12/2012 |
| JP | 2012-252206 A | 12/2012 |

* cited by examiner

BEFORE CORRECTION

AFTER CORRECTION

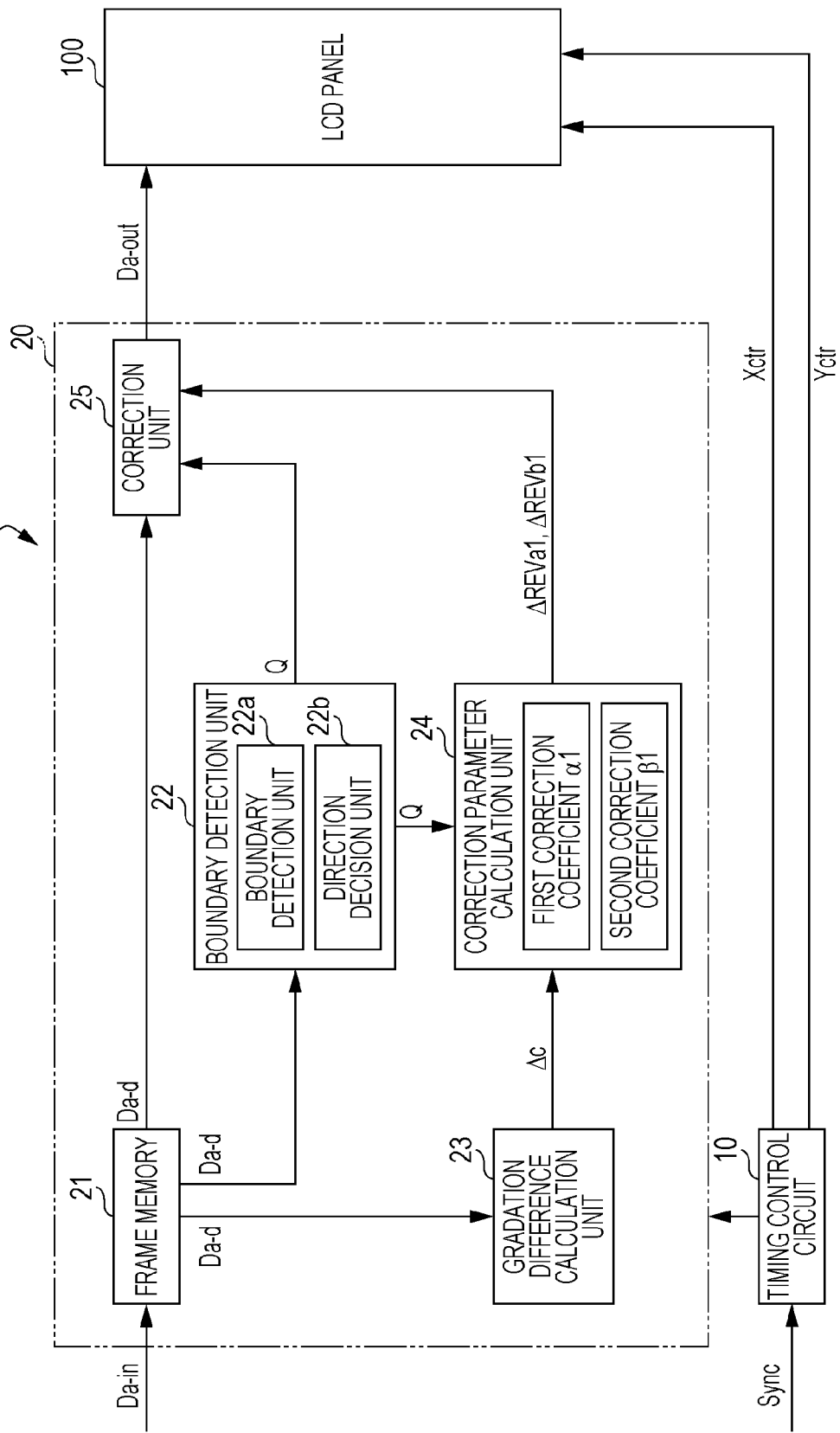

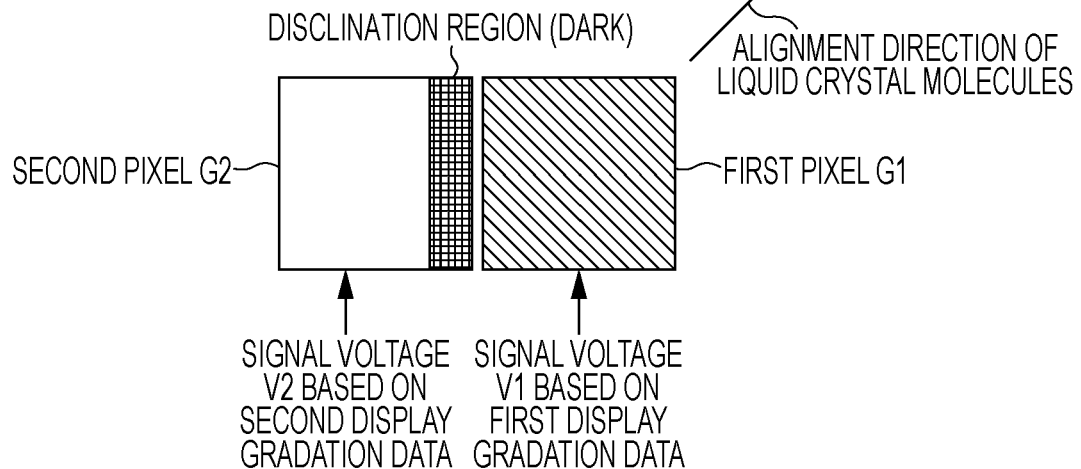
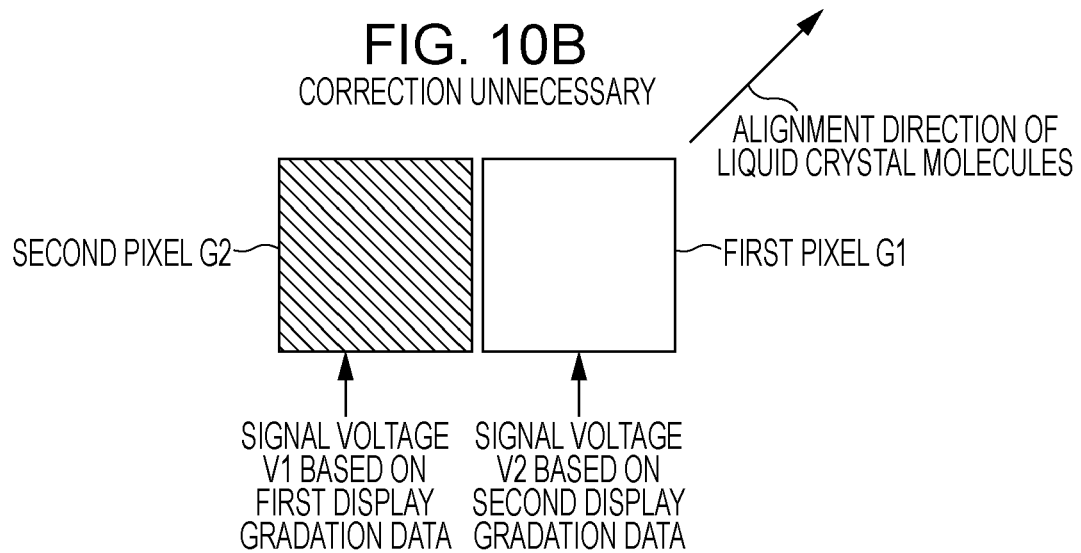

FIG. 11A

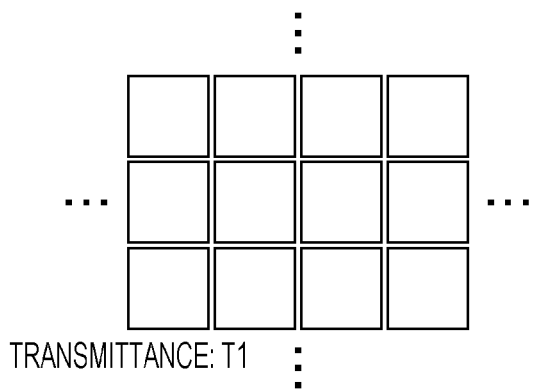

TRANSMITTANCE: T1

INPUT:
SIGNAL VOLTAGE V2
BASED ON SECOND DISPLAY
GRADATION DATA

FIG. 11B

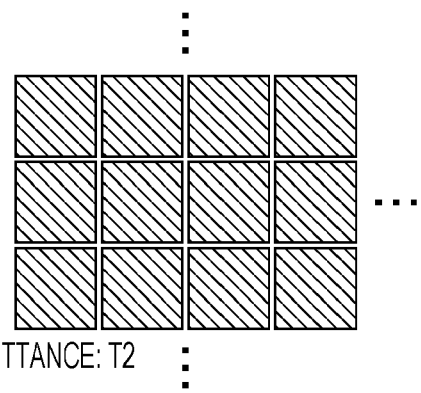

TRANSMITTANCE: T2

INPUT:
SIGNAL VOLTAGE V1
BASED ON FIRST DISPLAY
GRADATION DATA

FIG. 11C

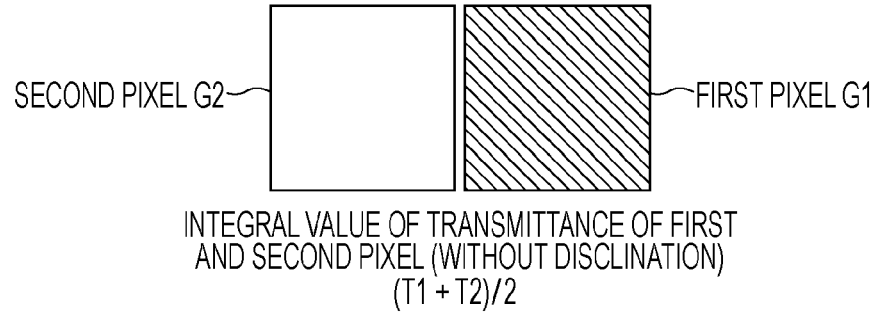

INTEGRAL VALUE OF TRANSMITTANCE OF FIRST
AND SECOND PIXEL (WITHOUT DISCLINATION)
(T1 + T2)/2

FIG. 11D

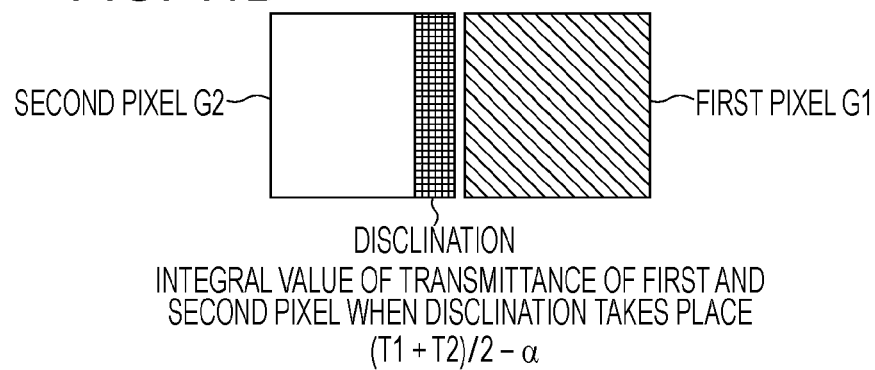

DISCLINATION
INTEGRAL VALUE OF TRANSMITTANCE OF FIRST AND
SECOND PIXEL WHEN DISCLINATION TAKES PLACE
$(T1 + T2)/2 - \alpha$

SIGNAL PROCESSING DEVICE, SIGNAL PROCESSING METHOD, LIQUID CRYSTAL DEVICE, AND ELECTRONIC APPARATUS

BACKGROUND

1. Technical Field

The invention relates to a signal processing device, a signal processing method, and a liquid crystal device capable of suppressing emergence of disclination, and an electronic apparatus including the liquid crystal device.

2. Related Art

In a liquid crystal panel (hereinafter, LCD panel), an electric field directed to a common electrode from a pixel electrode (or vice versa) may be directed to an adjacent pixel electrode owing to a potential difference between adjacent pixels, thus turning into a transverse electric field, which causes the liquid crystal molecules to be aligned in a direction different from the desired alignment direction. Such a phenomenon is known as disclination. The emergence of disclination may provoke degradation in display quality of the LCD panel. Techniques for suppressing the disclination can be found, for example, in JP-A-2009-25417, JP-A-2009-104053, JP-A-2009-104055, JP-A-2009-237366, and JP-A-2009-237524.

The emergence of disclination may be suppressed by correcting the gradation data of one or both of the pixels subjected to the transverse electric field so as to reduce the difference in signal voltage between those pixels, because by such correction the transverse electric field is attenuated, and resultantly the emergence of disclination can be suppressed. However, reducing the potential difference between the adjacent pixels leads to reduction in gradation difference between the pixels, which may result in another drawback, a blur in the image. The blur can be minimized by driving the LCD so as to emphasize contours. However, the driving method to suppress disclination and the driving method to emphasize contours are generally contradictory to each other.

SUMMARY

An advantage of some aspects of the invention is suppression of disclination without incurring a blur, to realize higher display quality.

In an aspect, the invention provides a signal processing device applicable to a liquid crystal device including a plurality of pixels. The signal processing device includes a detection unit that detects, on the basis of a signal that controls a voltage to be applied to each of the plurality of pixels, a boundary between (i) a first pixel corresponding to a first signal that applies a first voltage and (ii) a second pixel adjacent to the first pixel and corresponding to a second signal that applies a second voltage different in potential from the first voltage at least by a predetermined threshold; and a correction unit that corrects the first signal to a third signal that applies a third voltage higher than the first voltage, and the second signal to a fourth signal that applies a fourth voltage higher than the second voltage. The second voltage is higher than the first voltage, the fourth voltage is higher than the third voltage, and a potential difference between the first voltage and the third voltage is larger than a potential difference between the second voltage and the fourth voltage.

In the foregoing signal processing device, the detection unit detects the boundary between the first pixel to which the first voltage based on the first signal is applied, and the second pixel to which the second voltage based on the second signal is applied, the first signal being different from the potential of the common electrode by a relatively small amount, and the second signal being different from the potential of the common electrode by a relatively large amount. Then the correction unit corrects both the first signal for the first pixel and the second signal for the second pixel, so as to increase the voltage to be applied. For example, in the case where the potential to be applied to the pixel electrode of the first pixel and the potential to be applied to the pixel electrode of the second pixel are higher than the potential to be applied to the common electrode (hereinafter referred to as positive polarity), the correction is performed to increase the potential to be applied to the pixel electrode of the first pixel and the potential to be applied to the pixel electrode of the second pixel.

More specifically, the correction unit corrects the first signal to the third signal and the second signal to the fourth signal. At this point, the second voltage is higher than the first voltage, the fourth voltage is higher than the third voltage, and the potential difference between the first voltage and the third voltage is larger than the potential difference between the second voltage and the fourth voltage. Accordingly, when the signal processing device applies the third voltage to the first pixel and the fourth voltage to the second pixel, the potential difference at the boundary between the first pixel and the second pixel is mitigated, and therefore the disclination is suppressed.

In addition, the transmittance of the second pixel is increased and hence the contours are emphasized, and therefore appearance of a blurred image is suppressed. Consequently, the aforementioned signal processing device can suppress both disclination and blur, to thereby realize higher display quality.

It is preferable that the detection unit compares between (i) a first integral value of transmittance of the first pixel and the second pixel obtained when the first voltage based on the first signal is applied to the first pixel and the second voltage based on the second signal is applied to the second pixel and (ii) a second integral value of transmittance of the second pixel and the first pixel obtained when the first voltage based on the first signal is applied to the second pixel and the second voltage based on the second signal is applied to the first pixel, and detects, out of boundaries between the first pixel and the second pixel, a boundary where the first integral value becomes smaller than the second integral value.

Such an arrangement is based on the fact that disclination takes place depending on an alignment direction of liquid crystal molecules. Only such a boundary where the first integral value is smaller than the second integral value, detected through the comparison between (i) the integral value of the transmittance (first integral value) obtained when the first voltage based on the first signal is applied to the first pixel adjacent to the boundary and the second voltage based on the second signal is applied to the second pixel (hereinafter referred to as first application condition) and (ii) the integral value of the transmittance (second integral value) obtained when the first voltage based on the first signal is applied to the second pixel and the second voltage based on the second signal is applied to the first pixel (hereinafter referred to as second application condition), in other words only such a boundary where disclination takes place, can be determined as the boundary where correction has to be performed. In the case, for example, where the first integral value under the first application condition is smaller than the second integral value under the second application condition, it can be assumed that disclination takes place under the first application condition, and therefore the correction has to be performed.

When the same correction is performed on boundaries where gradation difference is the same, the transmittance becomes different after the correction depending on whether disclination takes place, and therefore the display appears differently. Accordingly, it is preferable to perform the correction with respect to a minimum necessary number of pixels. The aforementioned arrangement allows only the boundaries where disclination takes place to be detected and corrected, thereby providing high display quality.

In the foregoing signal processing device, it is preferable that the detection unit compares between (i) an integral value of transmittance of the first pixel and the second pixel obtained when the first voltage based on the first signal is applied to the first pixel and the second voltage based on the second signal is applied to the second pixel, and (ii) an average value of (a) a first transmittance obtained when the first voltage based on the first signal is applied to the first pixel and the second pixel and (b) a second transmittance obtained when the second voltage based on the second signal is applied to the first pixel and the second pixel, and detects a boundary between the first pixel and the second pixel where the integral value is smaller than the average value.

Such an arrangement allows only the boundaries where disclination takes place to be detected and corrected, thereby preventing appearance of a blurred image originating from an increase in transmittance due to correction performed on a boundary that is free from disclination.

In another aspect, the invention provides a signal processing method for controlling a voltage to be applied to each of a plurality of pixels, in a liquid crystal device including a first substrate on which a plurality of pixel electrodes are provided, a second substrate on which a common electrode associated with the plurality of pixel electrodes is provided, a liquid crystal interposed between the plurality of pixel electrodes and the common electrode, and the plurality of pixels each composed of one of the plurality of pixel electrodes, the liquid crystal, and the common electrode. The signal processing method includes detecting, on the basis of a signal that controls a voltage to be applied to each of the plurality of pixels, a boundary between (i) a first pixel corresponding to a first signal that applies a first voltage and (ii) a second pixel adjacent to the first pixel and corresponding to a second signal that applies a second voltage different in potential from the first voltage at least by a predetermined threshold; and correcting the first signal to a third signal that applies a third voltage higher than the first voltage, and the second signal to a fourth signal that applies a fourth voltage higher than the second voltage. The correcting of the first signal and the second signal includes making the second voltage higher than the first voltage and making the fourth voltage higher than the third voltage, such that a potential difference between the first voltage and the third voltage becomes larger than a potential difference between the second voltage and the fourth voltage.

With the foregoing method, the boundary between the first pixel to which the first voltage based on the first signal is applied and the second pixel to which the second voltage based on the second signal is applied is detected, the first signal being different from the potential of the common electrode by a relatively small amount, and the second signal being different from the potential of the common electrode by a relatively large amount. Then both the first signal for the first pixel and the second signal for the second pixel are corrected so as to increase the voltage to be applied. For example, in the case where the potential to be applied to the pixel electrode of the first pixel and the potential to be applied to the pixel electrode of the second pixel are higher than the potential to be applied to the common electrode, the correction is performed to increase the potential to be applied to the pixel electrode of the first pixel and the potential to be applied to the pixel electrode of the second pixel.

More specifically, the first signal is corrected to the third signal and the second signal is corrected to the fourth signal. At this point, the second voltage is higher than the first voltage, the fourth voltage is higher than the third voltage, and the potential difference between the first voltage and the third voltage is larger than the potential difference between the second voltage and the fourth voltage. Accordingly, when the third voltage is applied to the first pixel and the fourth voltage is applied to the second pixel, the potential difference at the boundary between the first pixel and the second pixel is mitigated, and therefore the disclination is suppressed.

In addition, the transmittance of the second pixel is increased and hence the contours are emphasized, and therefore appearance of a blurred image is suppressed. Consequently, the aforementioned signal processing method can suppress both disclination and blur, to thereby realize higher display quality.

In still another aspect, the invention provides a liquid crystal device including a first substrate on which a plurality of pixel electrodes are provided, a second substrate on which a common electrode associated with the plurality of pixel electrodes is provided, a liquid crystal interposed between the plurality of pixel electrodes and the common electrode, a plurality of pixels each composed of one of the plurality of pixel electrodes, the liquid crystal, and the common electrode, and a signal processing unit that controls a voltage to be applied to each of the plurality of pixels. The signal processing unit includes a detection unit that detects, on the basis of a signal that controls a voltage to be applied to each of the plurality of pixels, a boundary between (i) a first pixel corresponding to a first signal that applies a first voltage and (ii) a second pixel adjacent to the first pixel and corresponding to a second signal that applies a second voltage different in potential from the first voltage at least by a predetermined threshold; and a correction unit that corrects the first signal to a third signal that applies a third voltage higher than the first voltage, and the second signal to a fourth signal that applies a fourth voltage higher than the second voltage. The second voltage is higher than the first voltage, the fourth voltage is higher than the third voltage, and a potential difference between the first voltage and the third voltage is larger than a potential difference between the second voltage and the fourth voltage.

In the foregoing liquid crystal device, the detection unit detects the boundary between the first pixel to which the first voltage based on the first signal is applied, and the second pixel to which the second voltage based on the second signal is applied, the first signal being different from the potential of the common electrode by a relatively small amount, and the second signal being different from the potential of the common electrode by a relatively large amount. Then the correction unit corrects both the first signal for the first pixel and the second signal for the second pixel, so as to increase the voltage to be applied. For example, in the case where the potential to be applied to the pixel electrode of the first pixel and the potential to be applied to the pixel electrode of the second pixel are higher than the potential to be applied to the common electrode (hereinafter referred to as positive polarity), the correction is performed to increase the potential to be applied to the pixel electrode of the first pixel and the potential to be applied to the pixel electrode of the second pixel.

More specifically, the correction unit corrects the first signal to the third signal and the second signal to the fourth signal. At this point, the second voltage is higher than the first voltage, the fourth voltage is higher than the third voltage, and the potential difference between the first voltage and the third voltage is larger than the potential difference between the second voltage and the fourth voltage. Accordingly, when the signal processing device applies the third voltage to the first pixel and the fourth voltage to the second pixel, the potential difference at the boundary between the first pixel and the second pixel is mitigated, and therefore the disclination is suppressed.

In addition, the transmittance of the second pixel is increased and hence the contours are emphasized, and therefore appearance of a blurred image is suppressed. Consequently, the aforementioned liquid crystal device can suppress both disclination and blur, to thereby realize higher display quality.

In still another aspect, the invention provides an electronic apparatus including a display unit incorporated with the foregoing liquid crystal device.

The display unit of the thus-configured electronic apparatus includes the aforementioned liquid crystal device.

The electronic apparatus with such a display unit can suppress both disclination and blur, to thereby realize higher display quality.

BRIEF DESCRIPTION OF THE DRAWINGS

The invention will be described with reference to the accompanying drawings, wherein like numbers reference like elements.

FIG. 9 is a block diagram showing a general configuration of an electro-optical apparatus according to a second embodiment of the invention.

FIGS. 10A and 10B are schematic diagrams for explaining a correction process according to the second embodiment.

FIGS. 11A to 11D are schematic diagrams for explaining a correction process according to a variation of the second embodiment.

DESCRIPTION OF EXEMPLARY EMBODIMENTS

Figure 1:
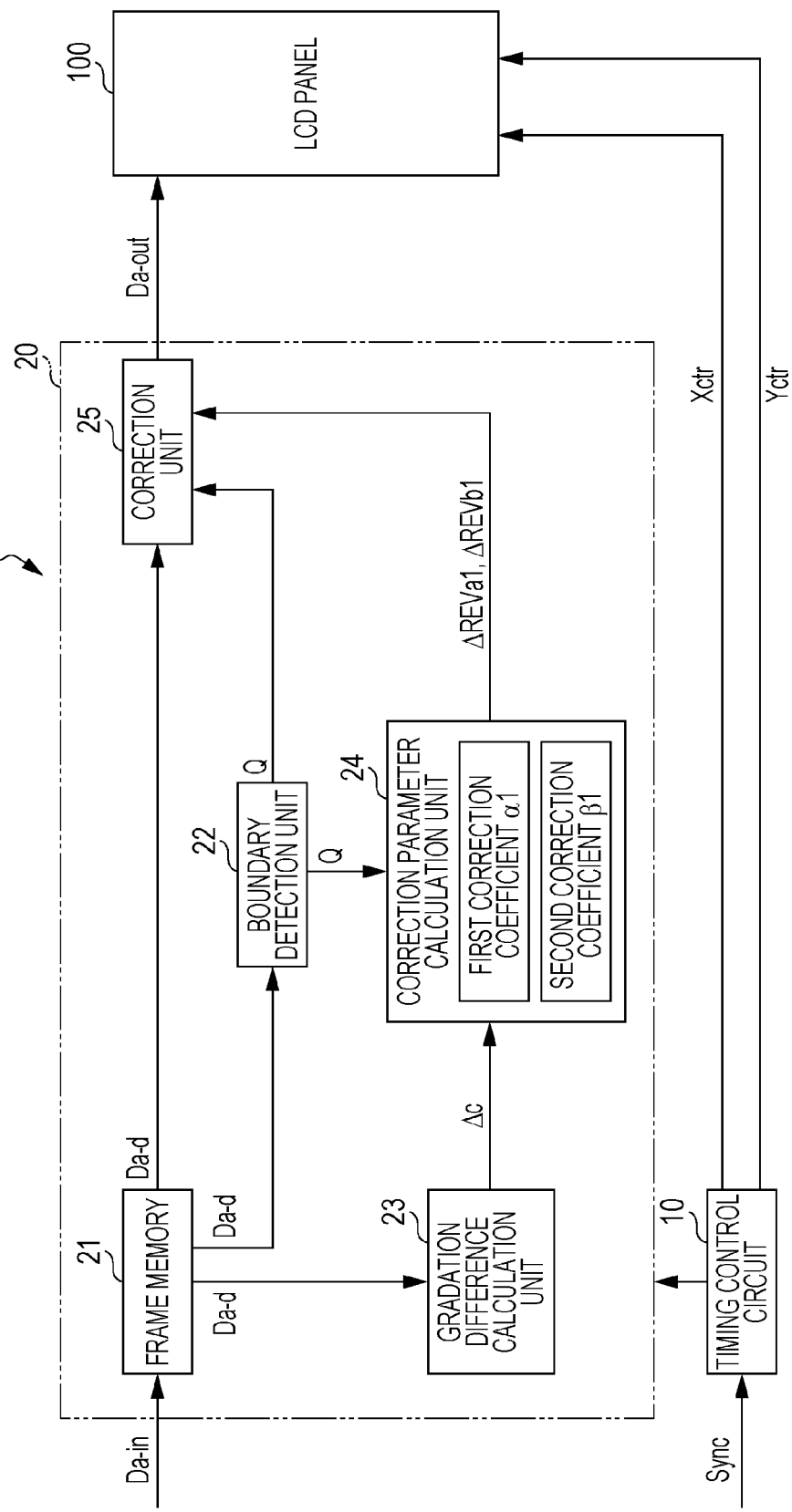
FIG. 1 is a block diagram showing a general configuration of an electro-optical apparatus according to a first embodiment of the invention.

Hereafter, embodiments of the invention will be described referring to the drawings. In the drawings, the scales of constituents may be different from actual ones for the sake of visual clarity.

First Embodiment

FIG. 1 is a block diagram showing a general configuration of an electro-optical apparatus (liquid crystal device) according to a first embodiment of the invention.

As shown in FIG. 1, the electro-optical apparatus 1 includes three essential components, namely a timing control circuit 10, an LCD panel 100, and a display control circuit 20 (signal processing device).

The timing control circuit 10 generates various control signals to thereby control functional units of the electro-optical apparatus 1 in synchronization with synchronous signals Sync provided from a superordinate apparatus (not shown).

The display control circuit 20 serves to control the displaying performance of the electro-optical apparatus 1. The display control circuit 20 receives inputs of gradation data Da-in from the superordinate apparatus in synchronization with the synchronous signals Sync.

The gradation data Da-in is digital data that designates a gradation level of each pixel of a plurality of pixels of the LCD panel 100 (display region 101 to be described later). The gradation level is a parameter that defines the brightness of the pixel. In this embodiment, the gradation data Da-in is composed of 8 bits, and designates the gradation level to be expressed by the pixel in 256 gradations in the decimal system from "0" (darkest) to "255" (brightest), in increments of "1".

The gradation data Da-in is provided in the sequence of scanning according to a vertical scanning signal, a horizontal scanning signal, and a dot clock signal (none shown) contained in the synchronous signal Sync. The display control circuit 20 processes the gradation data Da-in and outputs display voltage data Da-out to the LCD panel 100.

The display voltage data Da-out is composed of a voltage corresponding to the gradation data Da-in, or a value of corrected gradation data obtained through correction of the gradation data Da-in.

Details of the display control circuit 20 will be subsequently described.

The LCD panel 100 includes, in each of the pixels, a first substrate (not shown) on which a pixel electrode is provided and a second substrate (not shown) on which a common electrode corresponding to the plurality of pixels is provided, and a liquid crystal interposed therebetween. The pixel electrode, the liquid crystal, and the common electrode constitute a liquid crystal element 120, and the LCD panel 100 is constituted as an active matrix display unit configured to drive the pixels with switching elements such as a transistor.

The LCD panel 100 displays an image according to the display voltage data Da-out provided from the display control circuit 20. Here, although the gradation data Da-in designates the gradation level of the pixels (pixel 110 to be described later) of the LCD panel 100, the gradation data Da-in may be regarded as the data that designates the voltage to be applied to the liquid crystal element, because the voltage to be applied to the liquid crystal element (signal voltage) is determined according to the gradation level.

Figure 2:
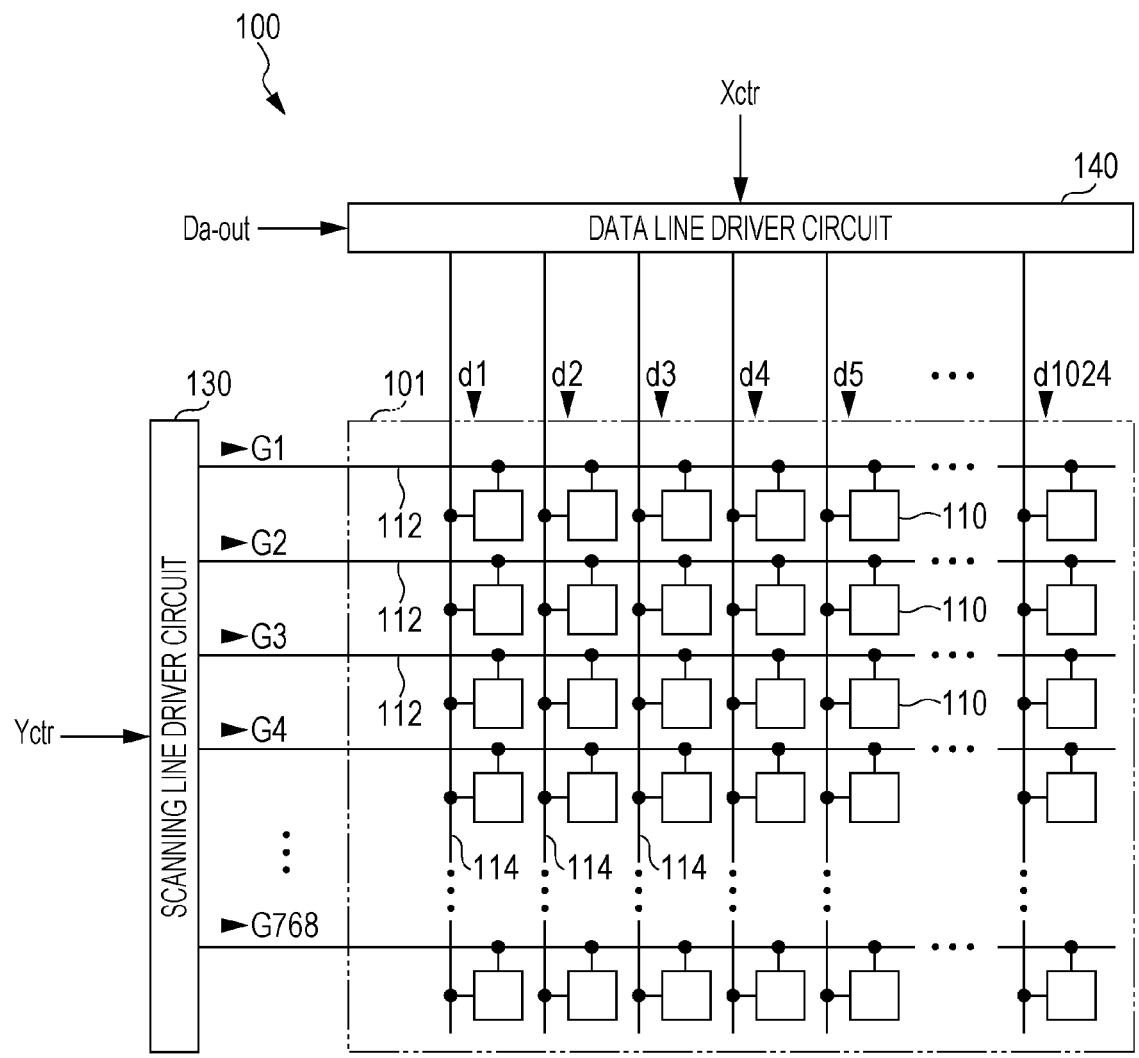
FIG. 2 is a schematic diagram showing a configuration of an LCD panel according to the first embodiment.

FIG. 2 is a schematic diagram showing a configuration of the LCD panel 100.

In the LCD panel 100, as shown in FIG. 2, the display region 101 where an image is displayed includes 768 rows of scanning lines 112, denoted as G1, G2, G3, . . . , G768, extending in one direction (horizontally in FIG. 2). The display region 101 also includes 1024 columns of data lines 114, denoted as d1, d2, d3, . . . , d1024, extending in the direction orthogonal to the scanning line 112 (vertically in FIG. 2).

The data lines 114 and the scanning lines 112 are electrically isolated from one another. The pixels 110 are provided at the respective intersections of the 768 rows of scanning lines 112 and the 1024 columns of data lines 114. Thus, in this embodiment the pixels 110 are arranged in a matrix pattern of 768 rows by 1024 columns in the display region 101.

A scanning line driver circuit 130 and a data line driver circuit 140 are disposed by the side of the display region 101.

The scanning line driver circuit 130 selects a scanning line 112 designated by a selection signal Yctr provided from the timing control circuit 10. The scanning line driver circuit 130 raises the scanning signal for the selected scanning line 112 to H-level corresponding to a selected voltage, and lowers the scanning signal for the remaining scanning lines 112 to L-level corresponding to a non-selected voltage.

The data line driver circuit 140 drives the pixels 110 according to the display voltage data Da-out, by what is known as a voltage modulation method. More specifically, the data line driver circuit 140 provides, in accordance with the selection signal Xctr provided from the timing control circuit 10, the first to the 1024th data lines 114 with data signals indicating a voltage according to the display voltage data Da-out.

The driver circuit of the electro-optical apparatus 1 is realized by collaboration of the thus-configured scanning line driver circuit 130 and the data line driver circuit 140.

The pixels 110 each include the liquid crystal element 120 composed of the pixel electrode, the common electrode, and the liquid crystal interposed therebetween, and when the corresponding scanning line 112 is selected the data signal provided to the data line 114 is applied to the pixel electrode.

Figure 3:
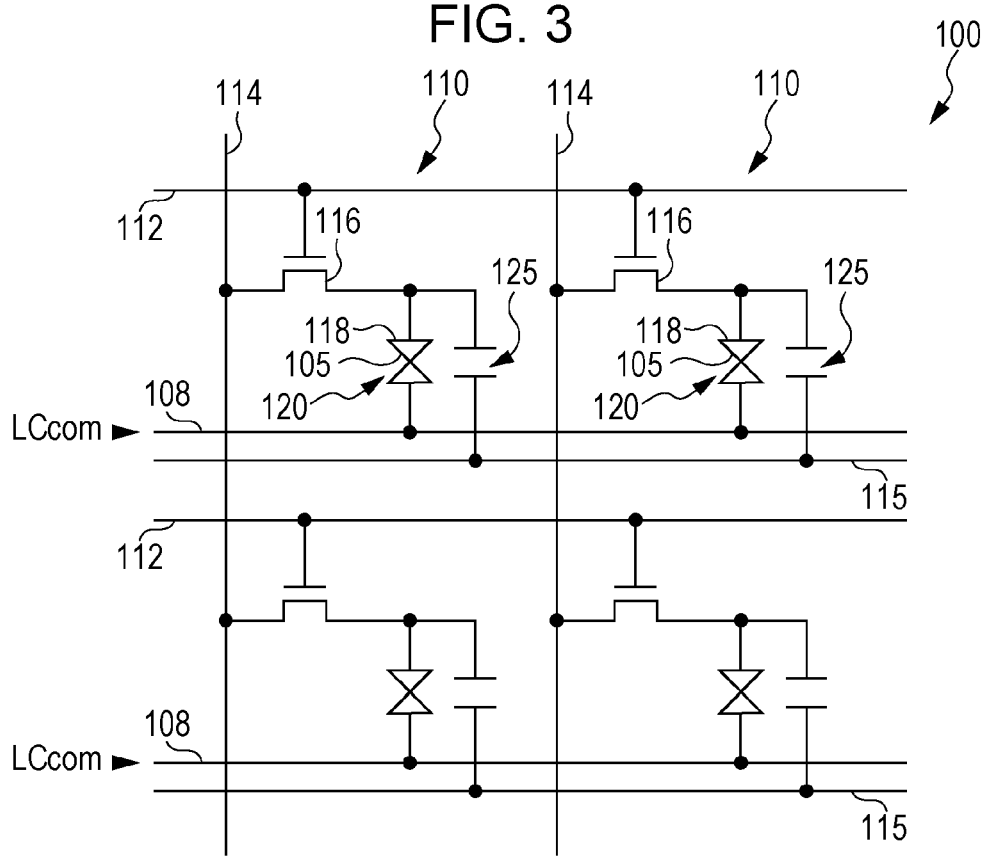
FIG. 3 is a circuit diagram showing an equivalent circuit of the LCD panel according to the first embodiment.

FIG. 3 is a circuit diagram showing an equivalent circuit of the LCD panel 100.

As shown in FIG. 3, the LCD panel 100 includes the liquid crystal elements 120 each composed of the pixel electrode 118, the common electrode 108, and the liquid crystal 105 interposed therebetween, at the respective intersections of the scanning lines 112 and the data lines 114. In the equivalent circuit of the LCD panel 100, the liquid crystal elements 120 each include an auxiliary capacitance (storage capacitance) 125 provided in parallel. The auxiliary capacitance 125 has an end connected to the pixel electrode 118 and the other end connected in common to a capacitance line 115. The capacitance line 115 is maintained in a voltage that is constant with time.

When the scanning line 112 is set to the H-level a TFT 116 having the gate electrode connected to the scanning line 112 is turned on, and the pixel electrode 118 and the data line 114 are connected to each other. Accordingly, when the data signal of a voltage corresponding to the gradation is supplied to the data line 114 when the scanning line 112 is at the H-level, the data signal is provided to the pixel electrode 118 through the TFT 116 that has been turned on. When the scanning line 112 falls to the L-level the TFT 116 is turned off, however the voltage applied to the pixel electrode 118 is retained by the capacitance line 115 of the liquid crystal element 120 and the auxiliary capacitance 125.

In the liquid crystal element 120, the alignment condition of the molecules of the liquid crystal 105 varies depending on the electric field generated by the pixel electrode 118 and the common electrode 108. Accordingly, the liquid crystal element 120 presents, in the case of being a transmissive type, a transmittance according to the applied/retained voltage. Since the pixels 110 of the LCD panel 100 each include the liquid crystal element 120, the transmittance varies in each of the pixels 110.

In this embodiment, the liquid crystal 105 is of the vertical alignment (VA) type, and set in the normally black mode in which the liquid crystal presents a black display when no voltage is applied to the liquid crystal element 120.

Figure 4:
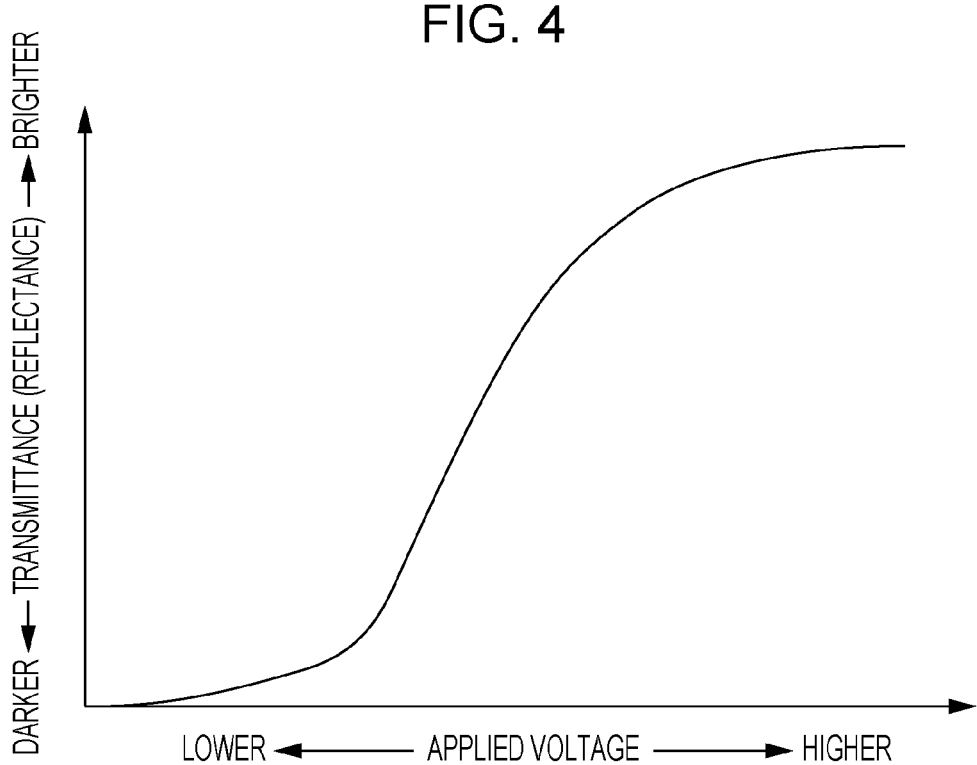
FIG. 4 is a graph showing a V-T characteristic in the normally black mode.

FIG. 4 is a graph showing a relationship between the applied voltage and the transmittance (hereinafter, V-T characteristic) of the liquid crystal element 120 in the normally black mode. In the graph of FIG. 4, the horizontal axis represents the voltage applied to the liquid crystal element 120, and the vertical axis represents the transmittance (more particularly, relative transmittance) of the liquid crystal element 120. To set the liquid crystal element 120 to the transmittance according to the gradation level designated by the display voltage data Da-out, a voltage according to the gradation level is to be applied to the liquid crystal element 120. In the normally black mode, the higher the gradation level is, the higher the voltage to be applied to the liquid crystal element 120 becomes.

Generally, the pixel capacitance is driven by AC to prevent degradation of the liquid crystals 105. Here, to drive the pixels so as to express a given gradation level when driving the liquid crystal element 120 by AC, both the positive polarity on the higher side of the mid-level voltage and the negative polarity on the lower side of the mid-level voltage have to be employed.

On the other hand, to express the minimum gradation represented by the gradation level of "0", it is only a voltage LCcom that is to be applied to the common electrode 108, unrelated to the polarity, in the case where no voltage is to be applied to the liquid crystal element 120. However, in the case where a voltage close to zero is to be applied, both the positive polarity and the negative polarity with respect to the mid-level voltage are involved.

In this embodiment, the ground potential (not shown) will be regarded as the reference of voltage "0" unless otherwise noted, except for the voltage applied to the liquid crystal element 120. The voltage applied to the liquid crystal element 120 corresponds to the potential difference between the voltage LCcom of the common electrode 108 and the pixel electrode 118.

Here, when a difference in voltage applied to the liquid crystal element 120 of the pixels 110 adjacent to each other becomes larger than a threshold, the transverse electric field grows more intense owing to the difference in applied voltage, which may result in disclination.

Out of such pixels 110, the pixel on the lower potential side may present black or nearly black close to the minimum gradation, or may present a relatively bright level close to an intermediate gradation.

On the other hand, the pixel 110 on the higher potential side may present a brightness close to the intermediate gradation, or may present white or nearly white close to the maximum gradation.

Thus, the brightness around the region where disclination takes place owing to the potential difference between the adjacent pixels 110 differs in various manners.

Figure 5A:
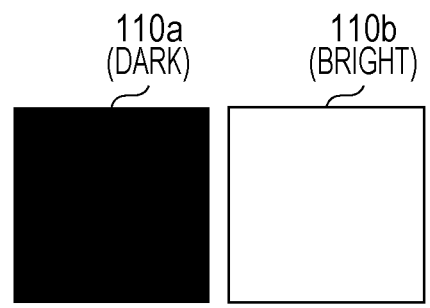
FIGS. 5A and 5B are schematic drawings for explaining a region where disclination takes place.
Figure 5B:
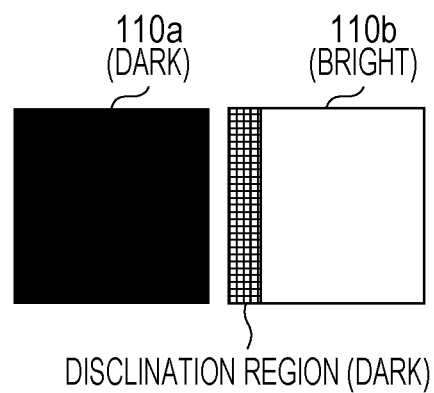

FIGS. 5A and 5B are schematic drawings for explaining the region where disclination takes place.

As shown in FIG. 5A, when the pixel 110a that is black or nearly black (first pixel) and a pixel 110b that is white or nearly white (second pixel) are located adjacent to each other, these pixels have to present a uniform transmittance. However, because of the disclination originating from the transverse electric field around the boundary between the pixel 110a and the pixel 110b, actually the pixel 110a and the pixel 110b are made to appear as shown in FIG. 5B. More particularly, a part of the pixel 110b on the higher potential side close to the boundary between the pixel 110a and the pixel 110b turns to the disclination region.

Referring again to FIG. 1, a configuration of the display control circuit 20 will be described in details.

The display control circuit 20 includes a frame memory 21, a boundary detection unit 22, a gradation difference calculation unit 23, a correction parameter calculation unit 24, and a correction unit 25.

The frame memory 21 includes storage regions corresponding to the pixel array of 768 rows by 1024 columns in the display region 101 (see FIG. 2), and stores the gradation data Da-in corresponding to one frame.

The term "frame" herein means a period of time necessary for displaying a frame of an image by driving the LCD panel 100. This period is the reciprocal of the frequency of the vertical scanning signal contained in the synchronous signal Sync, for example 16.7 m/s when the frequency is 60 Hz.

In each of the storage regions corresponding to the pixel array, the gradation data Da-in designating the gradation level of the corresponding pixel 110 is stored.

The gradation data Da-in is provided from an external apparatus and written in the storage regions of the frame memory 21. The storage of the gradation data Da-in in the frame memory 21 and the retrieval of gradation data Da-d from the frame memory 21 are performed, for example, by a memory controller (not shown) according to the driving timing of the LCD panel 100 under the control of the timing control circuit 10. The gradation data Da-in and the gradation data Da-d represent substantially the same content, which are distinguished depending on whether the data is to be stored in the frame memory 21 (gradation data Da-in) or to be retrieved from the frame memory 21 (gradation data Da-d).

The boundary detection unit 22 (detection unit) analyzes the gradation data Da-d retrieved from the frame memory 21, to thereby detect a boundary between a pixel on the lower potential side and a pixel on the higher potential side, where a difference in voltage to be applied designated by the gradation data Da-in is larger than a predetermined threshold.

More specifically, the boundary detection unit 22 detects a boundary between the adjacent pixels where a difference in gradation level therebetween is larger than the threshold, on the basis of the gradation data Da-d. Upon detecting such a boundary, the boundary detection unit 22 sets the flag Q of the output signal as "1", and otherwise as "0".

In the description given hereafter, the voltage to be applied to the pixel on the lower potential side adjacent to the boundary detected by the boundary detection unit 22 (first voltage) will be denoted as "Va", and the corresponding gradation level will be denoted as "a". Likewise, the voltage to be applied to the pixel on the higher potential side adjacent to the boundary (second voltage) will be denoted as "Vb", and the corresponding gradation level will be denoted as "b". Here, the boundary detection unit 22 is unable to detect the boundary in the image to be displayed without looking up the gradation data Da-in of the plurality of scanning lines. Accordingly, the frame memory 21 in the display control circuit 20 serves to enable the boundary detection unit 22 to look up the data. Further, a pixel adjacent to a given pixel refers to a pixel a side of which is opposed to one of the sides of the latter pixel. Accordingly, four pixels are located adjacent to a given pixel, except for the pixels located along the edge of the display region 101. In addition, the threshold of the difference in voltage to be applied to the adjacent pixels (gradation difference), which is used to decide whether disclination takes place, may be determined by experimental calculations and set in the display control circuit 20.

The gradation difference calculation unit 23 calculates a gradation difference $\Delta c$ between two pixels adjacent to each other, on the basis of the gradation data Da-d (first signal, second signal) retrieved from the frame memory 21. In this embodiment, the gradation difference calculation unit 23 determines the gradation difference $\Delta c$ by subtracting the gradation level of the pixel on the lower gradation side from the gradation level of the pixel on the higher gradation side.

Here, the gradation difference $\Delta c$ corresponds to the difference in applied voltage between the pixels. Therefore, the larger the gradation difference $\Delta c$ is, the larger the difference in applied voltage between the pixels becomes.

The correction parameter calculation unit 24 includes a memory to store therein a first correction coefficient $\alpha 1$ and a second correction coefficient $\beta 1$. The correction parameter calculation unit 24 applies the correction coefficient to the gradation difference $\Delta c$ calculated by the gradation difference calculation unit 23 with respect to the boundary where the flag Q of the output signal of the boundary detection unit 22 is "1", in other words the boundary detected by the boundary detection unit 22, to thereby calculate correction parameters $\Delta REVa1$, $\Delta REVb1$. In this embodiment, the first correction coefficient $\alpha 1$ is set to be smaller than the second correction coefficient $\beta 1$ and, for example, $\alpha 1$ is 0.2 and $\beta 1$ is 0.5.

The correction parameter calculation unit 24 multiplies the gradation difference $\Delta c$ calculated by the gradation difference calculation unit 23 by the first correction coefficient $\alpha$ to thereby obtain the correction parameter $\Delta REVa1$. For example, in the case where the gradation difference $\Delta c$ is "50", the correction parameter $\Delta REVa1$ is obtained as $50 \times 0.2 = 10$.

Likewise, the correction parameter calculation unit 24 multiplies the gradation difference $\Delta c$ calculated by the gradation difference calculation unit 23 by the second correction coefficient $\beta$ to thereby obtain the correction parameter $\Delta REVb1$. For example, in the case where the gradation difference $\Delta c$ is "50", the correction parameter $\Delta REVa1$ is obtained as $50 \times 0.5 = 25$.

Since the first correction coefficient $\alpha 1$ is set to be smaller than the second correction coefficient $\beta 1$, the correction parameters $\Delta REVa1$, $\Delta REVb1$ obtained with the same gradation difference $\Delta c$ always satisfy the relationship of $\Delta REVa1 < \Delta REVb1$. In addition, the larger the gradation difference $\Delta c$ is, the larger the correction parameters $\Delta REVa1$, $\Delta REVb1$ become.

The correction unit 25 serves to correct the gradation data Da-d, and outputs the display voltage data Da-out (third signal, fourth signal) to the LCD panel 100.

The correction unit 25 corrects the gradation data Da-d for two pixels adjacent to the boundary where the flag Q of the output signal of the boundary detection unit 22 is "1", i.e., the boundary detected by the boundary detection unit 22, by increasing the voltages to be applied to those pixels such that the difference in voltage to be applied (difference in gradation level) becomes smaller, and more particularly such that the increase in voltage to be applied to the pixel on the lower potential side becomes larger than the increase in voltage to be applied to the pixel on the higher potential side.

In this embodiment, the correction unit 25 adds the correction parameter $\Delta REVa1$ to the gradation level "a" of the pixel on the lower potential side according to the gradation data Da-d retrieved from the frame memory 21, thus to determine the corrected gradation level a1 for that pixel. Likewise, the correction unit 25 adds the correction parameter $\Delta REVb1$ to the gradation level "b" of the pixel on the higher potential side according to the gradation data Da-d, thus to determine the corrected gradation level b1 for that pixel.

On the other hand, in the case where the flag Q of the output signal of the boundary detection unit 22 is "0", the correction unit 25 outputs the gradation data Da-d retrieved from the frame memory 21 to the LCD panel 100 as the display voltage data Da-out.

Since the gradation data Da-d and the gradation data Da-in represent substantially the same content, the correction unit 25 may be regarded as performing the correction of the gradation data Da-in.

Hereunder, a specific example of the correction process of the correction unit 25 will be described.

Figure 6A:
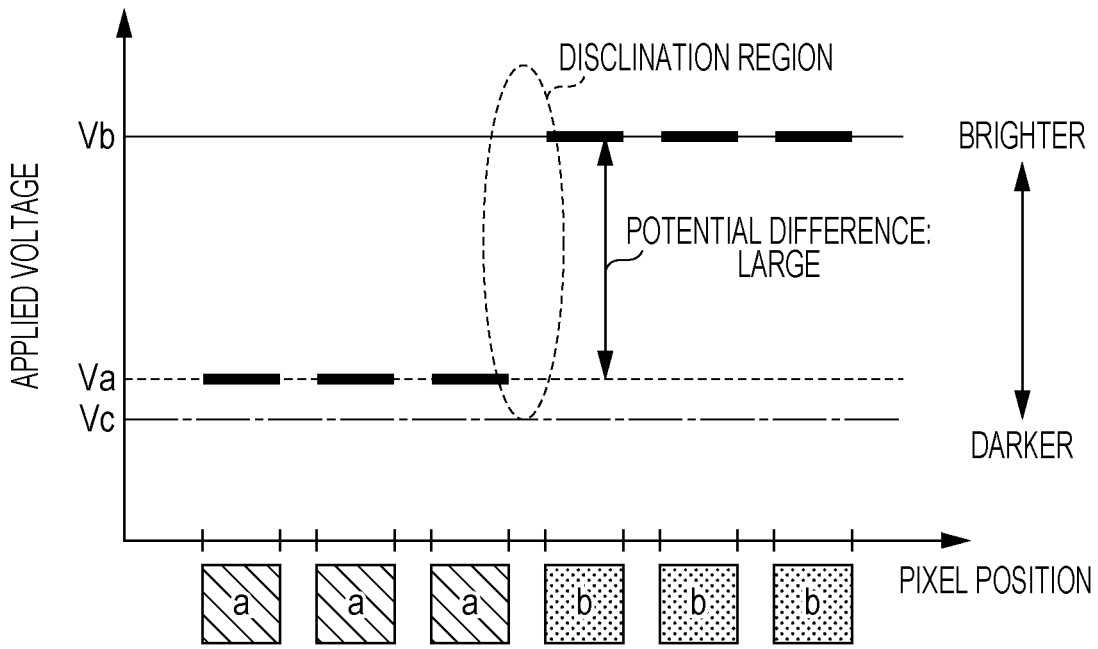
FIGS. 6A and 6B are schematic diagrams for explaining a correction process according to the first embodiment.
Figure 6B:
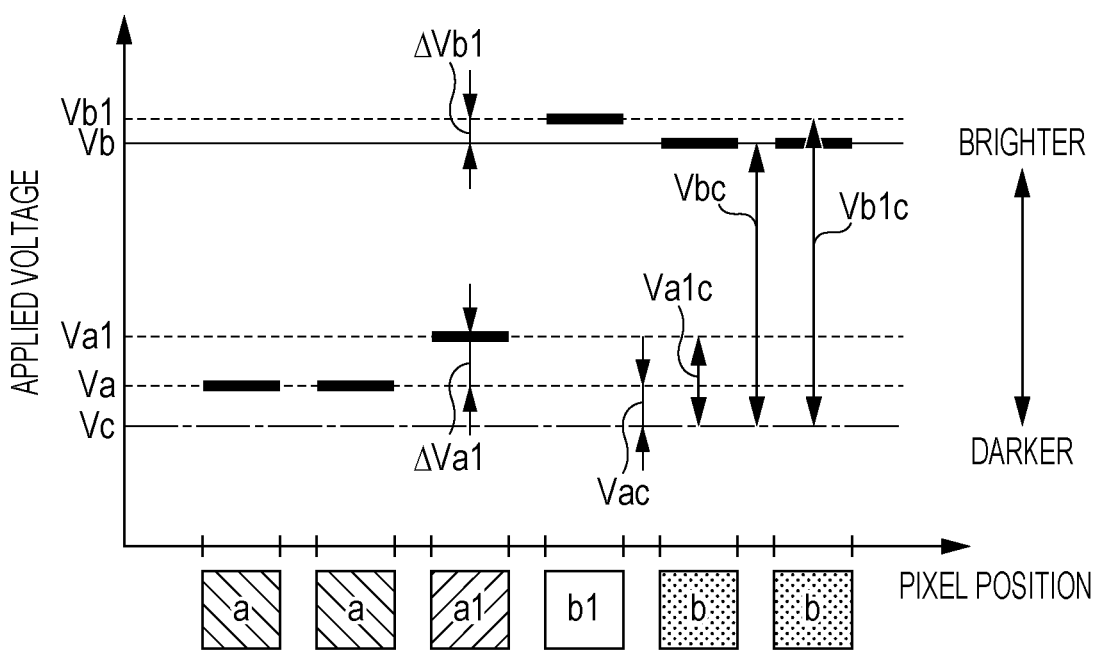

FIGS. 6A and 6B are schematic diagrams for explaining the correction process performed by the correction unit 25. FIGS. 6A and 6B illustrate the correspondence between six pixels aligned in a row and the voltage to be applied to the respective pixels, on the premise of positive polarity. FIG. 6A illustrates the correspondence before the correction, and FIG. 6B illustrates the correspondence after the correction.

As shown in FIG. 6A, in the case where the potential difference between the pixel of the gradation level "a" on the lower potential side and the pixel of the gradation level "b" on the higher potential side is larger than the threshold, LCD panel 100 becomes susceptible to the transverse electric field. Therefore, the region in the vicinity of the boundary between the relevant pixels is prone to incur disclination.

In the case of negative polarity, the relationship becomes symmetric with respect to a voltage Vcnt (substantially equal to the voltage LCcom) and hence the order of the magnitude of the potential is reversed. However, since the potential difference remains large as well, the region in the vicinity of the boundary between the relevant pixels is prone to incur disclination.

In contrast, as shown in FIG. 6B, the display voltage data Da-out corrected by the correction unit 25 designates an applied voltage Va1 (third voltage) higher by $\Delta Va1$ than the voltage Va (first voltage) to be applied to the pixel of the gradation level "a" on the lower potential side adjacent to the boundary, and an applied voltage Vb1 (fourth voltage) higher by $\Delta Vb1$ ($<\Delta Va1$) than the voltage Vb (second voltage) to be applied to the pixel of the gradation level "b" on the higher potential side.

In the vicinity of the boundary where the aforementioned correction has been performed, the potential difference is reduced compared with the state before the correction and therefore the disclination is eliminated or mitigated. At the same time, the potential of the pixel on the higher potential side (white or nearly white) is increased and hence the transmittance is increased, which makes the pixel brighter. Consequently, the contours of the image are emphasized and appearance of a blurred image is suppressed. Thus, both the disclination and blur can be suppressed and higher display quality can be obtained.

In the correction process, the correction unit 25 corrects the voltage Va based on the first gradation data (first signal) to the voltage Va1 based on the first corrected gradation data (third signal), such that the difference Va1c between the potential Vc of the common electrode and the voltage Va1 becomes larger than the difference Vac between the potential Vc of the common electrode and the voltage Va.

Further, the correction unit 25 corrects the voltage Vb (second voltage) based on the second gradation data (second signal) to the voltage Vb1 (fourth voltage) based on the second corrected gradation data (fourth signal), such that (i) the difference Vb1c between the potential Vc of the common electrode and the voltage Vb1 becomes larger than the difference Vbc between the potential Vc of the common electrode and the voltage Vb, and that (ii) the difference $\Delta Vb1$ between the voltage Vb and the voltage Vb1 becomes smaller than the difference $\Delta Va1$ between the voltage Va based on the first gradation data and the voltage Va1 based on the first corrected gradation data.

In other words, the voltage Va is converted to the voltage Va1 and the voltage Vb is converted to the voltage Vb1, in which process the variation of the signal voltage $\Delta Vb1$ from the voltage Vb to the voltage Vb1 is smaller than the variation of the signal voltage $\Delta Va1$ from the voltage Va to the voltage Va1 ($\Delta Vb1<\Delta Va1$).

Therefore, upon causing the driver circuit to apply voltages to the first pixel and the second pixel, the potential difference at the boundary therebetween is mitigated and hence disclination is suppressed. In addition, the transmittance of the second pixel is increased and hence the contours are emphasized and appearance of a blurred image is suppressed. Consequently, the aforementioned signal processing device can suppress both disclination and blur, to thereby realize higher display quality.

In addition, the display control circuit 20 according to this embodiment increases the variation of the gradation level (variation of the voltage to be applied), the larger the gradation difference $\Delta c$ in the gradation data Da-in (difference in voltage to be applied) between two pixels adjacent to each other is. Since disclination is less likely to take place in the case where the gradation difference $\Delta c$ is relatively small, the display control circuit 20 performs the correction so as to suppress the variation of the gradation data Da-in through the correction, to thereby avoid contradictory disadvantages to the display quality.

On the contrary, since the disclination is more prone to take place when the gradation difference $\Delta c$ is relatively large, the display control circuit 20 allows the variation of the gradation data Da-in to be larger through the correction, to thereby reduce the intensity of the transverse electric field. Thus, the display control circuit 20 is capable of correcting the gradation data Da-in to the appropriate extent depending on the likelihood of the emergence of disclination.

In general, reducing the pretilt angle of the liquid crystal element is prone to provoke the emergence of disclination. However, since the configuration according to this embodiment suppresses disclination, the LCD panel 100 can be formed with a reduced pretilt angle to thereby improve the contrast ratio. In addition, although increasing the cell gap between the pixel electrode 118 and the common electrode 108 is prone to provoke the emergence of disclination, since the configuration according to this embodiment suppresses disclination the cell gap of the LCD panel 100 can be increased to improve the transmittance, contrast ratio, and durability of light-resisting property.

Further, the configuration according to this embodiment provides three major synergistic effects as described hereunder, in addition to achieving both of suppression of disclination and emphasis of contours.

First, visibility of moving picture can be improved. When the voltages applied to the liquid crystal elements 120 on both the higher potential side and the lower potential side of a boundary to be corrected are increased, charging of parasitic capacitance component (not shown) in the data lines 114, generated when the data is written in the pixels, is completed more promptly, and therefore the time for writing the data in both of the liquid crystal elements 120 is shortened. In the case of increasing only the voltage to be applied to the liquid crystal element 120 on the lower potential side which requires a longer time for writing the data therein, the blur of the image is worsened, though the time for writing the data in that liquid crystal element 120 is shortened. Therefore, significant improvement in visibility of moving picture cannot be expected. On the other hand, increasing only the voltage applied to the liquid crystal element 120 on the higher potential side increases the potential difference between the liquid crystal elements 120 on the higher potential side and the lower potential side, and therefore disclination becomes more prominent, contrary to the primary purpose of suppressing the disclination. Besides, although the time for writing the data is shortened, the visibility of moving picture can barely be improved because the liquid crystal element 120 on the lower potential side, which requires a longer time for writing the data therein, plays a predominant role in determining the visibility of moving picture. Consequently, it is necessary to increase both of the voltages to be applied to the liquid crystal elements 120 on the higher potential side and the lower potential side, in order to improve the visibility of moving picture without compromising the display quality.

Figure 7:
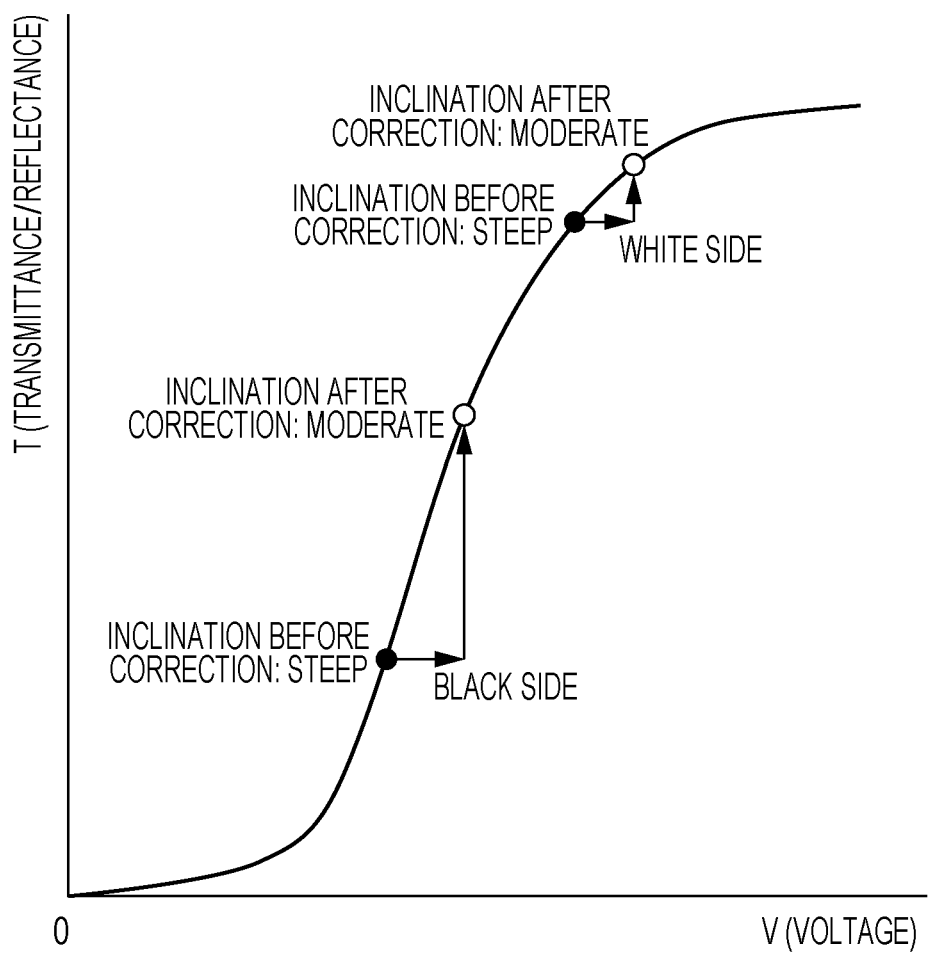
FIG. 7 is a graph for explaining effects of the correction process according to the first embodiment.

Second, flickering can be suppressed. FIG. 7 is a graph showing a V-T characteristic of the normally black liquid crystal. In view of the shape of the curved line, it is understood that slope of the transmittance, i.e., the inclination of the curved line is more moderate after the correction, both on the lower potential side and the higher potential side. Accordingly, asymmetry of the potential of the common electrode, for example originating from a parasitic capacitance component generated in the TFT 116 when the polarity of the liquid crystal is switched, is suppressed, which leads to reduced likelihood that flickering takes place.

In the case of increasing only the voltage applied to the liquid crystal element 120 on the higher potential side, the potential difference from the liquid crystal element 120 on the lower potential side is increased and hence disclination becomes more prominent, contrary to the primary purpose of suppressing the disclination, although the flickering can be suppressed in the liquid crystal element on the higher potential side. Besides, the lower potential side is a region where the linearity of the V-T characteristic is prominent, and therefore the flickering can barely be suppressed in the liquid crystal element 120 on the lower potential side.

Consequently, it is necessary to increase both of the voltages to be applied to the liquid crystal elements 120 on the higher potential side and the lower potential side, in order to suppress the flickering without compromising the display quality. Suppressing the flickering contributes to prolonging the life span of the LCD panel 100, by reducing deposition of ionic impurities due to the asymmetry of the potential of the common electrode, by preventing burn-in, and so forth.

Third, a gradation shift can be suppressed. As in the preceding passage, the V-T characteristic of the normally black liquid crystal shown in FIG. 7 will be referred to for describing this advantageous effect. From the shape of the curved line, it is understood that slope of the transmittance, i.e., the inclination of the curved line is more moderate after the correction, both on the lower potential side and the higher potential side. Such properties contribute to suppressing a gradation shift that degrades the display quality, originating from manufacturing fluctuation of, for example, the data line driver circuit provided outside or inside the LCD panel 100. In the case of increasing only the voltage applied to the liquid crystal element 120 on the higher potential side, the potential difference from the liquid crystal element 120 on the lower potential side is increased and hence disclination becomes more prominent, contrary to the primary purpose of suppressing the disclination, although the gradation shift can be suppressed in the liquid crystal element on the higher potential side. Besides, the lower potential side is a region where the linearity of the V-T characteristic is prominent, and therefore the gradation shift can barely be suppressed in the liquid crystal element 120 on the lower potential side.

Consequently, it is necessary to increase both of the voltages to be applied to the liquid crystal elements 120 on the higher potential side and the lower potential side, in order to suppress the gradation shift without compromising the display quality. Suppressing the gradation shift contributes, in addition to preventing degradation in display quality, to increasing the operational margin of the signal driver circuits, thereby improving the production yield and reducing consumption of power and resources, which leads to better global and space environments.

Second Embodiment

A second embodiment of the invention will now be described hereunder.

Figure 8A:
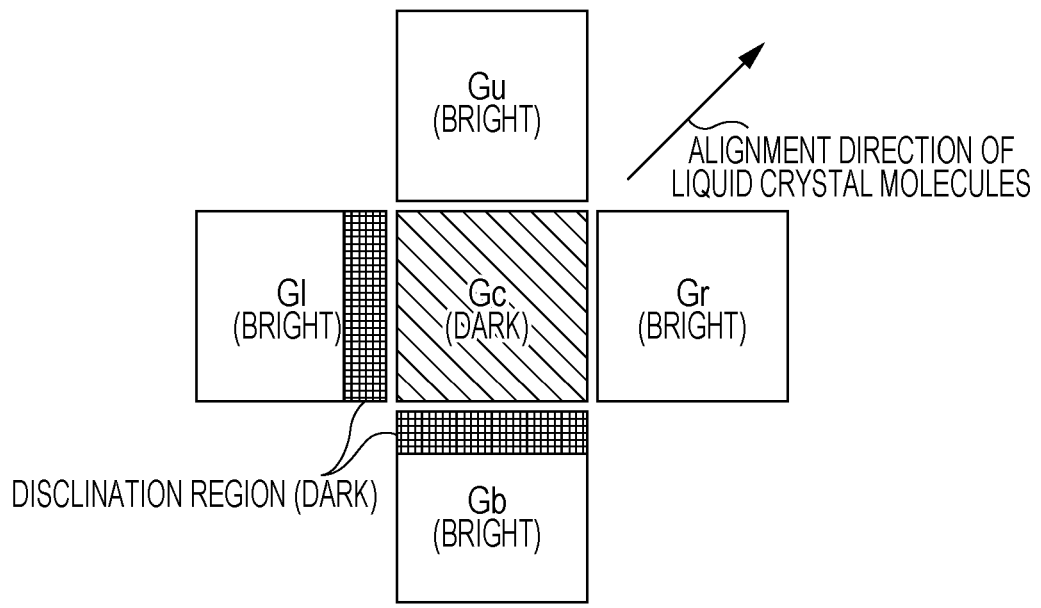
FIGS. 8A and 8B are schematic diagrams for explaining a relationship between emergence of disclination and alignment direction of liquid crystal molecules.
Figure 8B:
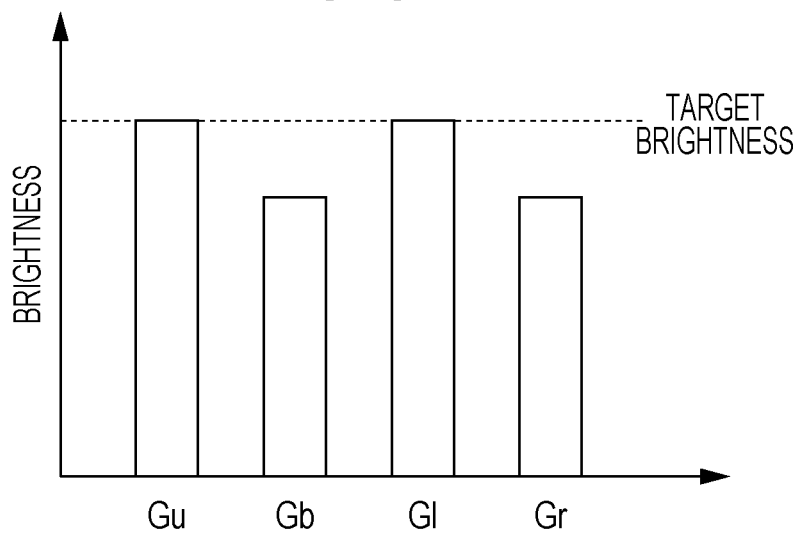

According to the first embodiment, the boundary to be corrected is detected on the basis of the gradation difference, for the correction process. Therefore, the correction is performed on regions where a white region and a black region are located adjacent to each other, more particularly on the boundaries between a white or nearly white pixel and a black or nearly black pixel, irrespective of the alignment direction of the liquid crystal molecules. However, the likelihood of the emergence of disclination depends on the alignment direction of the liquid crystal molecules, and therefore, as shown in FIGS. 8A and 8B, the disclination is incurred in a pixel G1 and a pixel Gb and hence the brightness of these pixels is slightly reduced from a target brightness while a pixel Gu and a pixel Gr remain free from disclination and achieve the target brightness.

Accordingly, it is preferable to perform the correction on the boundary between the white pixel and the black pixel where disclination takes place, and to leave the boundary between the white pixel and the black pixel free from disclination uncorrected, in order to achieve the target brightness. This embodiment is different from the first embodiment in that the boundary detection unit 22 is configured to detect only the boundaries between the white pixel and the black pixel where disclination takes place.

Referring to FIGS. 9, 10A, and 10B, the electro-optical apparatus 1 according to this embodiment will be described. The electro-optical apparatus 1 according to this embodiment is only slightly different from the electro-optical apparatus according to the first embodiment, the constituents denoted by the same numeral as that of the first embodiment will be construed as having the same function as those of the first embodiment, and the description of such constituents will not be repeated. The description given below primarily refers to differences from the first embodiment.

FIG. 9 is a block diagram showing a general configuration of the electro-optical apparatus 1 according to the second embodiment.

The electro-optical apparatus 1 according to this embodiment is different from the first embodiment in that the boundary detection unit 22 includes a boundary detection unit 22a and a direction decision unit 22b. The direction decision unit 22b is configured to decide whether the correction process is to be performed, on the basis of the positional arrangement of the white region and the black region in the vicinity of the boundary therebetween and the alignment direction of the liquid crystal molecules. Although whether disclination takes place depends on the alignment direction of the liquid crystal molecules, the configuration according to this embodiment enables the emergence of disclination to be detected despite the alignment direction being unknown, as shown in FIGS. 10A and 10B.

To be more specific, (i) the integral value of the transmittance of a first pixel G1 and a second pixel G2 shown in FIG. 10A, obtained when a signal voltage V1 based on the first gradation data is applied to the first pixel G1 and a signal voltage V2 based on the second gradation data is applied to the second pixel G2, and (ii) the integral value of the transmittance of the first pixel G1 and the second pixel G2 shown in FIG. 10B, obtained when the signal voltage V1 based on the first gradation data is applied to the second pixel G2 and the signal voltage V2 based on the second gradation data is applied to the first pixel G1, are individually calculated and compared.

The integral value of the transmittance can be obtained, for example by measuring the illuminance of a projected image containing pixels having one or more boundaries between white and black regions with an illuminance meter, and integrating the illuminance data.

The disclination takes place in the region where the integral value thus obtained is smaller, and therefore the correction process has to be performed. Through such a method, the alignment direction of the liquid crystal molecules can be detected in advance despite the alignment direction being unknown yet, and upon setting the detected alignment direction in the direction decision unit the correction process can be performed only with respect to the boundary between the white and black regions where disclination takes place.

Variation

The method of detecting the unknown alignment direction according to the second embodiment may be performed in a different manner. FIG. 11A illustrates a state where the signal voltage V2 based on the second gradation data is applied to a region of a plurality of pixels including both the first pixel and the second pixel, by which a transmittance value T1 is obtained. FIG. 11B illustrates a state where the signal voltage V1 based on the first gradation data is applied to a region of a plurality of pixels including both the first pixel and the second pixel, by which a transmittance value T2 is obtained. The transmittance values T1, T2 can be obtained for example by measuring the illuminance of the projected image with an illuminance meter.

The integral value of the transmittance of the first pixel G1 and the second pixel G2 obtained when the signal voltage V1 based on the first gradation data is applied to the first pixel G1 and the signal voltage V2 based on the second gradation data is applied to the second pixel G2 can be expressed as (T1+T2)/2 as shown in FIG. 11C unless disclination takes place, and estimated as the average of the transmittance T1 and the transmittance T2.

On the other hand, in the case where disclination dependent on the alignment direction takes place the integral value becomes (T1+T2)/2−α as shown in FIG. 11D, and thus the transmittance values T1, T2 become lower than the average value cited above.

In other words, the disclination takes place when the transmittance value is lower than the estimated value. When the disclination takes place, the correction process is to be performed. Through the method according to this variation also, the alignment direction of the liquid crystal molecules can be detected in advance despite the alignment direction being unknown yet, and upon setting the detected alignment direction in the direction decision unit the correction process can be performed only with respect to the boundary between the white and black regions where disclination takes place.

Third Embodiment

A third embodiment of the invention will be described hereunder.

Figure 12:
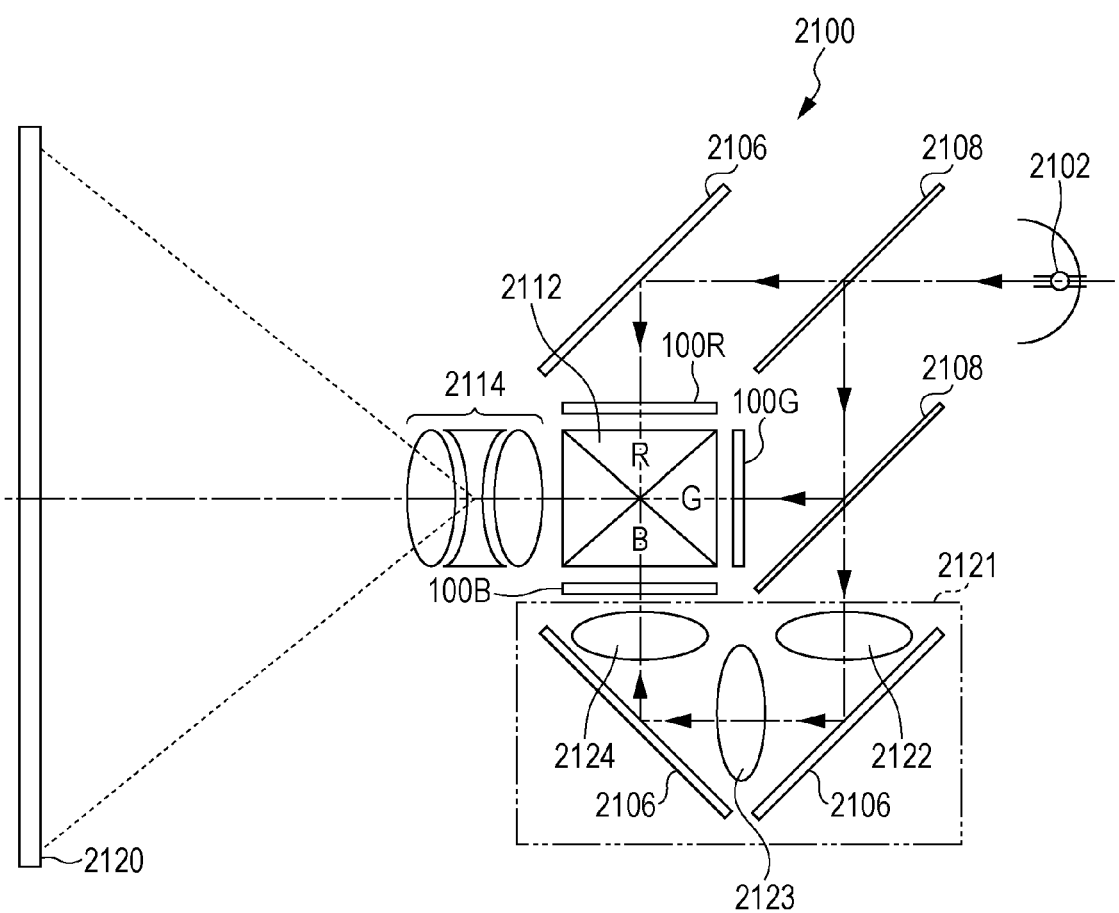
FIG. 12 is a schematic plan view showing a configuration of a projector.

This embodiment represents a projector that includes the LCD panel 100 as the light bulb, as an example of the electronic apparatus incorporated with the electro-optical apparatuses according to the foregoing embodiments. FIG. 12 is a schematic plan view showing a configuration of the projector according to this embodiment.

As shown in FIG. 12, the projector 2100 includes therein a lamp unit 2102 constituted of a white light source such as a halogen lamp. Projecting light emitted from the lamp unit 2102 is split into light beams of three primary colors namely red (R), green (G), and blue (B) through three mirrors 2106 and two dichroic mirrors 2108 mounted inside, and respectively led to light bulbs 100R, 100G, and 100B corresponding to the primary colors. Here, the light beam of B travels over a longer optical path compared with the light beams of R and G, and is therefore led through a relay lens system 2121 composed of an input lens 2122, a relay lens 2123, and an output lens 2124, for minimizing the optical loss.

The projector 2100 includes three units of the electro-optical apparatuses each including the foregoing LCD panel 100 and respectively corresponding to the RGB colors. The light bulbs 100R, 100G, and 100B have the same configuration as that of the LCD panel 100. Picture signals that respectively designate the gradation level of the RGB colors are provided from an external superordinate circuit, to thereby drive the light bulbs 100R, 100G, and 100B.

The light beams respectively modulated by the light bulbs 100R, 100G, and 100B are incident upon a dichroic prism 2112 from three directions. The light beams of R and B are refracted by 90 degrees, while the light beam of G travels straight ahead. Then after the images of the respective primary colors are synthesized, the color image is projected on a screen 2120 through a projection lens 2114.

Since the light beams respectively representing the RGB colors are incident upon the light bulbs 100R, 100G, and 100B through the dichroic mirror 2108, there is no need to provide a color filter. In addition, the images transmitted through the light bulbs 100R, 100B are projected after being reflected by the dichroic prism 2112, while the image transmitted through the light bulb 100G is directly projected. Therefore, the horizontal scanning directions of the light bulbs 100R, 100B are reversed with respect to the horizontal scanning direction of the light bulb 100G, so that the horizontally reversed images are displayed.

In addition to the projector described referring to FIG. 12, the invention is broadly applicable to electronic apparatuses such as a TV set, a view-finder type or direct-view video recorder, a car navigation system, a pager, an electronic organizer, a pocket calculator, a word processor, a work station, a TV phone, a POS terminal, a digital still camera, a mobile phone, and apparatuses with a touch panel. Further, as a matter of course, the foregoing electro-optical apparatus is applicable to all the electronic apparatuses cited above.

This application claims priority to Japan Patent Application No. 2012-136615 filed Jun. 18, 2012, the entire disclosures of which are hereby incorporated by reference in their entireties.

What is claimed is:

1. A signal processing device comprising:
   a detection unit that detects, on the basis of a signal that controls a voltage to be applied to each of the plurality of pixels, a boundary between (i) a first pixel corresponding to a first signal that applies a first voltage and (ii) a second pixel adjacent to the first pixel and corresponding to a second signal that applies a second voltage different in potential from the first voltage at least by a predetermined threshold; and
   a correction unit that corrects the first signal to a third signal that applies a third voltage higher than the first voltage, and the second signal to a fourth signal that applies a fourth voltage higher than the second voltage, wherein the second voltage is higher than the first voltage, the fourth voltage is higher than the third voltage, and a potential difference between the first voltage and the third voltage is larger than a potential difference between the second voltage and the fourth voltage.

2. The signal processing device according to claim 1, wherein the detection unit compares between:
(i) a first integral value of transmittance of the first pixel and the second pixel obtained when the first voltage based on the first signal is applied to the first pixel and the second voltage based on the second signal is applied to the second pixel; and
(ii) a second integral value of transmittance of the second pixel and the first pixel obtained when the first voltage based on the first signal is applied to the second pixel and the second voltage based on the second signal is applied to the first pixel, and
detects, out of boundaries between the first pixel and the second pixel, a boundary where the first integral value becomes smaller than the second integral value.

3. The signal processing device according to claim 1, wherein the detection unit compares between:
(i) an integral value of transmittance of the first pixel and the second pixel obtained when the first voltage based on the first signal is applied to the first pixel and the second voltage based on the second signal is applied to the second pixel; and
(ii) an average value of (a) a first transmittance obtained when the first voltage based on the first signal is applied to the first pixel and the second pixel and (b) a second transmittance obtained when the second voltage based on the second signal is applied to the first pixel and the second pixel, and
detects a boundary between the first pixel and the second pixel where the integral value is smaller than the average value.

4. A signal processing method for controlling a voltage to be applied to each of a plurality of pixels, in a liquid crystal device including a first substrate on which a plurality of pixel electrodes are provided, a second substrate on which a common electrode associated with the plurality of pixel electrodes is provided, a liquid crystal interposed between the plurality of pixel electrodes and the common electrode, and the plurality of pixels each composed of one of the plurality of pixel electrodes, the liquid crystal, and the common electrode, the signal processing method comprising:
detecting, on the basis of a signal that controls a voltage to be applied to each of the plurality of pixels, a boundary between (i) a first pixel corresponding to a first signal that applies a first voltage and (ii) a second pixel adjacent to the first pixel and corresponding to a second signal that applies a second voltage different in potential from the first voltage at least by a predetermined threshold; and
correcting the first signal to a third signal that applies a third voltage higher than the first voltage, and the second signal to a fourth signal that applies a fourth voltage higher than the second voltage,
wherein the correcting of the first signal and the second signal includes:
making the second voltage higher than the first voltage; and
making the fourth voltage higher than the third voltage,
such that a potential difference between the first voltage and the third voltage becomes larger than a potential difference between the second voltage and the fourth voltage.

5. A liquid crystal device comprising:
a first substrate on which a plurality of pixel electrodes are provided;
a second substrate on which a common electrode associated with the plurality of pixel electrodes is provided;
a liquid crystal interposed between the plurality of pixel electrodes and the common electrode;
a plurality of pixels each composed of one of the plurality of pixel electrodes, the liquid crystal, and the common electrode; and
a signal processing unit that controls a voltage to be applied to each of the plurality of pixels,
wherein the signal processing unit includes:
a detection unit that detects, on the basis of a signal that controls a voltage to be applied to each of the plurality of pixels, a boundary between (i) a first pixel corresponding to a first signal that applies a first voltage and (ii) a second pixel adjacent to the first pixel and corresponding to a second signal that applies a second voltage different in potential from the first voltage at least by a predetermined threshold; and
a correction unit that corrects the first signal to a third signal that applies a third voltage higher than the first voltage, and the second signal to a fourth signal that applies a fourth voltage higher than the second voltage,
the second voltage is higher than the first voltage,
the fourth voltage is higher than the third voltage, and
a potential difference between the first voltage and the third voltage is larger than a potential difference between the second voltage and the fourth voltage.

6. An electronic apparatus comprising the liquid crystal device according to claim 5.

7. A signal processing device comprising:
a detection unit that detects, on the basis of a signal that controls a voltage to be applied to each of the plurality of pixels, (i) a first pixel being applied a first voltage on the basis of a first signal and (ii) a second pixel adjacent to the first pixel and being applied a second voltage on the basis of a second signal different in potential from the first voltage at least by a predetermined threshold; and
a correction unit that corrects the first signal to a third signal that applies a third voltage higher than the first voltage, and the second signal to a fourth signal that applies a fourth voltage higher than the second voltage,
wherein the second voltage is higher than the first voltage,
the fourth voltage is higher than the third voltage, and
a potential difference between the first voltage and the third voltage is larger than a potential difference between the second voltage and the fourth voltage.

8. The signal processing device according to claim 7, wherein the detection unit compares between:
(i) a first integral value of transmittance of the first pixel and the second pixel obtained when the first voltage based on the first signal is applied to the first pixel and the second voltage based on the second signal is applied to the second pixel; and
(ii) a second integral value of transmittance of the second pixel and the first pixel obtained when the first voltage based on the first signal is applied to the second pixel and the second voltage based on the second signal is applied to the first pixel, and detects the first pixel and the second pixel that make the first integral value smaller than the second integral value.

9. The signal processing device according to claim 7, wherein the detection unit compares between:
(i) an integral value of transmittance of the first pixel and the second pixel obtained when the first voltage based on the first signal is applied to the first pixel and the second voltage based on the second signal is applied to the second pixel, and
(ii) an average value of (a) a first transmittance obtained when the first voltage based on the first signal is applied to the first pixel and the second pixel and (b) a second transmittance obtained when the second voltage based on the second signal is applied to the first pixel and the second pixel, and
detects the first pixel and the second pixel that make the integral value smaller than the average value.

10. A signal processing method for controlling a voltage to be applied to each of a plurality of pixels, in a liquid crystal device including a first substrate on which a plurality of pixel electrodes are provided, a second substrate on which a common electrode associated with the plurality of pixel electrodes is provided, a liquid crystal interposed between the plurality of pixel electrodes and the common electrode, and the plurality of pixels each composed of one of the plurality of pixel electrodes, the liquid crystal, and the common electrode, the signal processing method comprising:
detecting, on the basis of a signal that controls a voltage to be applied to each of the plurality of pixels,
(i) a first pixel corresponding to a first signal that applies a first voltage and
(ii) a second pixel adjacent to the first pixel and corresponding to a second signal that applies a second voltage different in potential from the first voltage at least by a predetermined threshold; and
correcting the first signal to a third signal that applies a third voltage higher than the first voltage, and the second signal to a fourth signal that applies a fourth voltage higher than the second voltage,
wherein the correcting of the first signal and the second signal includes:
making the second voltage higher than the first voltage; and
making the fourth voltage higher than the third voltage,
such that a potential difference between the first voltage and the third voltage becomes larger than a potential difference between the second voltage and the fourth voltage.

11. A liquid crystal device comprising:
a first substrate on which a plurality of pixel electrodes are provided;
a second substrate on which a common electrode associated with the plurality of pixel electrodes is provided;
a liquid crystal interposed between the plurality of pixel electrodes and the common electrode;
a plurality of pixels each composed of one of the plurality of pixel electrodes, the liquid crystal, and the common electrode; and
a signal processing unit that controls a voltage to be applied to each of the plurality of pixels,
wherein the signal processing unit includes:
a detection unit that detects, on the basis of a signal that controls a voltage to be applied to each of the plurality of pixels, (i) a first pixel corresponding to a first signal that applies a first voltage and (ii) a second pixel adjacent to the first pixel and corresponding to a second signal that applies a second voltage different in potential from the first voltage at least by a predetermined threshold; and
a correction unit that corrects the first signal to a third signal that applies a third voltage higher than the first voltage, and the second signal to a fourth signal that applies a fourth voltage higher than the second voltage,
the second voltage is higher than the first voltage,
the fourth voltage is higher than the third voltage, and
a potential difference between the first voltage and the third voltage is larger than a potential difference between the second voltage and the fourth voltage.

12. An electronic apparatus comprising the liquid crystal device according to claim 11.

* * * * *